(12) United States Patent
Sugimoto

(10) Patent No.: US 11,097,652 B2
(45) Date of Patent: Aug. 24, 2021

(54) AIMING ADJUSTMENT METHOD FOR VEHICLE HEADLAMP, AIMING ADJUSTMENT MECHANISM FOR VEHICLE HEADLAMP AND VEHICLE HEADLAMP

(71) Applicant: KOITO MANUFACTURING CO., LTD., Tokyo (JP)

(72) Inventor: Atsushi Sugimoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 53 days.

(21) Appl. No.: 16/189,552

(22) Filed: Nov. 13, 2018

(65) Prior Publication Data
US 2019/0143885 A1 May 16, 2019

(30) Foreign Application Priority Data

Nov. 14, 2017 (JP) .............................. JP2017-218762

(51) Int. Cl.
*B60Q 1/14* (2006.01)
*F21S 41/143* (2018.01)
*F21S 41/153* (2018.01)
*F21S 41/663* (2018.01)
*B60Q 1/068* (2006.01)
*B60Q 1/00* (2006.01)
(Continued)

(52) U.S. Cl.
CPC ........... *B60Q 1/143* (2013.01); *B60Q 1/0064* (2013.01); *B60Q 1/0686* (2013.01); *F21S 41/143* (2018.01); *F21S 41/153* (2018.01); *F21S 41/663* (2018.01); *B60Q 2300/41* (2013.01); *B60Q 2300/42* (2013.01); *B60Q 2300/45* (2013.01); *F21Y 2115/10* (2016.08); *G01M 11/065* (2013.01)

(58) Field of Classification Search
CPC .... B60Q 1/0064; B60Q 1/068; B60Q 1/0683; B60Q 1/0686; B60Q 1/143; B60Q 2300/45; B60Q 2300/41; B60Q 2300/42; G01M 11/062; G01M 11/065; G01M 11/067; G01M 11/068; F21S 41/143; F21S 41/153; F21S 41/663
See application file for complete search history.

(56) References Cited

U.S. PATENT DOCUMENTS 10,551,020 B2 * 2/2020 Tsuda .................. B60Q 1/0683
10,697,607 B2 * 6/2020 Potter .................. F21S 41/657
(Continued)

FOREIGN PATENT DOCUMENTS

JP 2007-190986 A 8/2007

OTHER PUBLICATIONS

Office Action issued in corresponding French Application No. 1860459, dated Sep. 10, 2020 (7 pages).

*Primary Examiner* — Alan B Cariaso
(74) *Attorney, Agent, or Firm* — Osha Bergman Watanabe & Burton LLP

(57) ABSTRACT

There is provided an aiming adjustment method for a vehicle headlamp which performs aiming adjustment based on a reference point on a light-dark boundary of a light distribution pattern, the method includes setting, as the reference point, an intersection between a vertical light-dark boundary of a part of multi-divided light distribution patterns which are to be synthesized to form a high-beam light distribution pattern and a horizontal light-dark boundary of a low-beam light distribution pattern.

3 Claims, 6 Drawing Sheets

(51) Int. Cl.
    *G01M 11/06*     (2006.01)
    *F21Y 115/10*     (2016.01)

(56) References Cited

U.S. PATENT DOCUMENTS

| | | |
|---|---|---|
| 2005/0068786 A1 | 3/2005 | Ishida |
| 2010/0033984 A1* | 2/2010 | Sugimoto ............... F21S 41/17 362/538 |
| 2015/0204502 A1 | 7/2015 | Kleinkes et al. |
| 2017/0067609 A1* | 3/2017 | Ichikawa ............. B60Q 1/0683 |
| 2017/0088036 A1* | 3/2017 | Roeckl ................... B60Q 1/143 |
| 2018/0339644 A1* | 11/2018 | Kim ..................... B60Q 1/1415 |

\* cited by examiner

AIMING ADJUSTMENT METHOD FOR VEHICLE HEADLAMP, AIMING ADJUSTMENT MECHANISM FOR VEHICLE HEADLAMP AND VEHICLE HEADLAMP

CROSS-REFERENCE TO RELATED APPLICATION

This application claims priority from Japanese Patent Application No. 2017-218762, filed on Nov. 14, 2017, the entire subject matter of which is incorporated herein by reference.

TECHNICAL FIELD

Aspects of the present invention relate to an aiming adjustment method for a vehicle headlamp, an aiming adjustment mechanism for a vehicle headlamp, and a vehicle headlamp, which adjust an irradiation direction of a light distribution pattern.

BACKGROUND

JP-A-2007-190986 (paragraph [0021]) discloses a method of detecting an elbow point which is an intersection of a horizontal light-dark boundary cutoff line HC and an oblique light-dark boundary cutoff line DC of a low beam light distribution pattern of a headlamp, and performing aiming adjustment of a headlamp using the detected elbow point as a reference point.

In a headlamp using an adaptive driving beam system (ADB) with an LED array including a plurality of LEDs which can be turned on and off individually, LEDs which have an irradiation range within a range of target objects such as a preceding vehicle, an oncoming vehicle, or a pedestrian, which are detected by a camera or the like are turned off so as not to give glare to the target objects, resulting in that a high-beam light distribution pattern for illuminating only a necessary range is illuminated.

In general, a lamp unit which illuminate a high-beam pattern by synthesizing multi-divided light distribution patterns, such as an LED array is integrated with a lamp unit which illuminates a low-beam pattern in the headlight as disclosed in JP-A-2007-190986, or may be formed separately. The high-beam lamp unit fixed to the low-beam lamp unit may have a deviation from a predetermined attachment position relative to the low-beam lamp unit due to a manufacturing error.

In a headlamp including a low-beam lamp unit integrated with a high-beam lamp unit, an irradiation position of a low-beam pattern is adjusted when aiming adjustment is performed using an elbow point as in JP-A-2007-190986 as the reference point. However, the irradiation position of a high-beam light distribution pattern is not adjusted due to the manufacturing error. Further, in the high-beam lamp unit provided separately from the low-beam lamp unit in the headlight, the irradiation position of the high-beam pattern is not adjusted even if the aiming adjustment of the low-beam pattern is performed using the elbow point of JP-A-2007-190986 as the reference point.

In a case where the irradiation position of light deviates from a predetermined position due to the manufacturing error or low aiming adjustment accuracy, in order that light is not irradiated to the objects such as the preceding vehicle, the oncoming vehicle, the pedestrian or the like even if the irradiation range varies due to the positional deviation, the headlamp using adaptive driving beam system (ADB) adopts an excessively wide light-off range. Such excessive light-off range adopted due to the deviation of the irradiation position of light may narrow an illumination range of a vehicle.

SUMMARY

Accordingly, an aspect of the present application provides an aiming adjustment method for a vehicle headlamp, an aiming adjustment mechanism for a vehicle headlamp and a vehicle headlamp which can illuminate a high-beam light distribution pattern by synthesizing multi-divided light distribution patterns without an excessive light-off range.

According to an embodiment of the present invention, there is provided an aiming adjustment method for a vehicle headlamp which performs aiming adjustment based on a reference point on a light-dark boundary of a light distribution pattern. The method includes setting, as the reference point, an intersection between a vertical light-dark boundary of a part of multi-divided light distribution patterns which are to be synthesized to form a high-beam light distribution pattern and a horizontal light-dark boundary of a low-beam light distribution pattern.

According to the above configuration, the irradiation position accuracy of the multi-divided light distribution patterns is improved by the aiming adjustment in which the intersection between the vertical light-dark boundary of the part of the multi-divided light distribution patterns and the horizontal light-dark boundary of the low-beam light distribution pattern is set as the reference point.

According to another embodiment of the present invention, there is provided an aiming adjustment mechanism for a vehicle headlamp including a lamp unit, the lamp unit including therein a high-beam headlamp unit which is configured to illuminate a high-beam light distribution pattern by synthesizing multi-divided light distribution patterns, and a low-beam headlamp unit which is configured to illuminate a low-beam light distribution pattern. The aiming adjustment mechanism includes a lighting mode for aiming adjustment which causes the high-beam headlamp unit to illuminate a part of the multi-divided light distribution patterns and causes the low-beam headlamp unit to illuminate the low-beam light distribution pattern, so as to form an intersection between a vertical light-dark boundary of the multi-divided light distribution pattern and a horizontal light-dark boundary of the low-beam light distribution pattern.

According to the above configuration, in the lamp unit in the lighting mode for aiming adjustment, the intersection between the vertical light-dark boundary of the part of the multi-divided light distribution patterns and the horizontal light-dark boundary of the low-beam light distribution pattern is formed as a reference point of the aiming adjustment.

According to another embodiment, there is provided a vehicle headlamp includes the aiming adjustment mechanism.

According to the above configuration, the reference point of the aiming adjustment is illuminated on the vertical light-dark boundary of the part of the multi-divided light distribution patterns via the horizontal light-dark boundary of the low-beam light distribution pattern by turning on the lamp unit of the vehicle headlamp in the lighting mode for aiming adjustment.

According to the above-described aiming adjustment method for a vehicle headlamp, the irradiation position accuracy of the multi-divided light distribution patterns is improved, so that it is possible to illuminate a high-beam light distribution pattern with a wide illumination range in which the excessive light-off range of the high-beam light distribution pattern formed by synthesizing the multi-divided light distribution patterns can be reduced.

According to the above-described aiming adjustment mechanism for a vehicle headlamp and the vehicle headlamp including the same, the lighting mode for aiming adjustment is provided, so that the irradiation position accuracy of the multi-divided light distribution patterns is improved, and therefore, it is possible to illuminate the high-beam light distribution pattern in the lamp unit with a wide illumination range in which the excessive light-off range of the high-beam light distribution pattern formed by the synthesizing the multi-divided light distribution patterns can be reduced.

DETAILED DESCRIPTION OF EMBODIMENTS

Hereinafter, embodiments of the present invention will be described below with reference to FIG. 1 to FIG. 6C. In each drawing, directions of each part of the vehicle headlamp and the directions of the road viewed by a driver of a vehicle mounted with the vehicle headlamp is expressed as follows: upper: lower: left: right: front: front: rear=Up: Lo: Le: Ri: Fr: Re.

Figure 1:
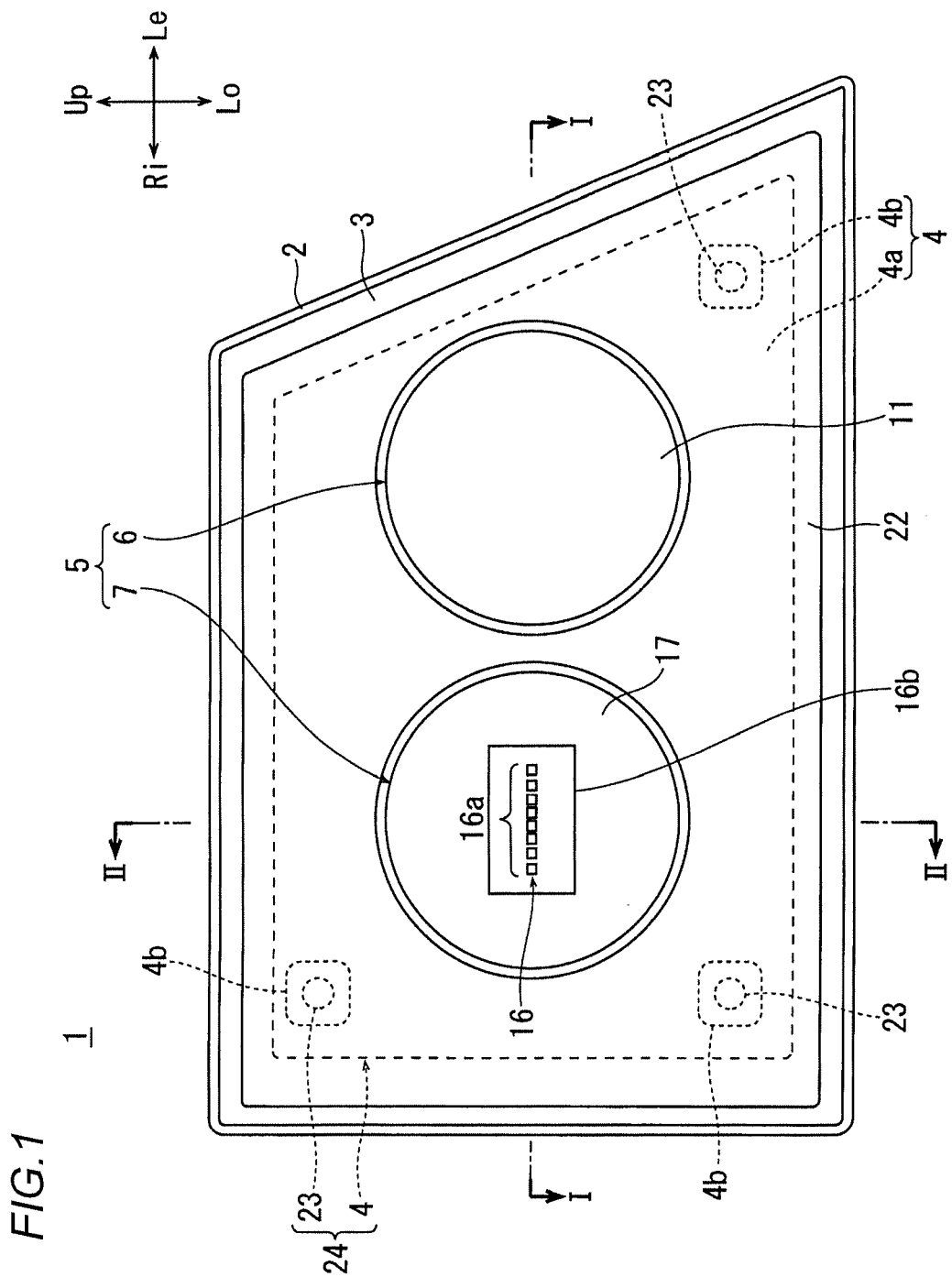
FIG. 1 is a front view of a vehicle headlamp according to a first embodiment to be used for aiming adjustment.

A vehicle headlamp according to a first embodiment to be used for aiming adjustment will be described with reference to FIG. 1 to FIG. 2C. A vehicle headlamp 1 of the first embodiment is one example of a left headlamp, and includes a lamp body 2, a front cover 3, and a headlamp unit 5. The lamp body 2 is formed of a resin or the like and has an opening on a front side of the vehicle, and the front cover 3 is formed of a light-transmitting resin, glass, or the like, and is attached to the opening of the lamp body 2 so as to form a lamp chamber S inside. The headlamp unit 5 shown in FIG. 1 is configured by integrating a low-beam headlamp unit 6 and a high-beam headlamp unit 7 onto a metal support member 4, and is disposed on an inner side of the lamp chamber S.

Figure 2A:
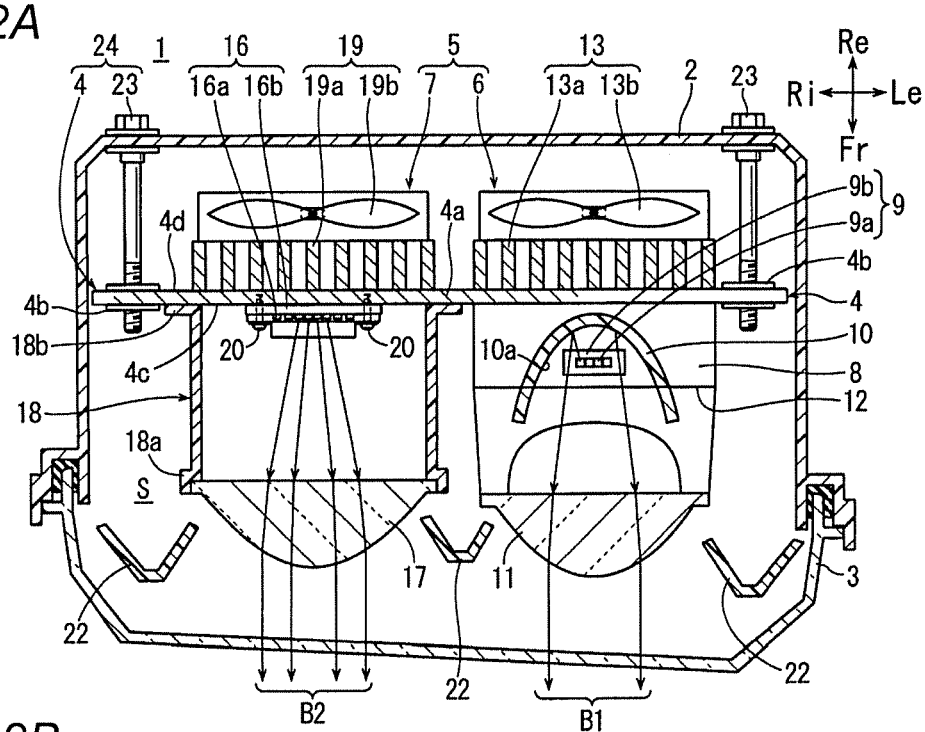
FIG. 2A is a cross sectional view taken along line I-I of FIG. 1 in which the vehicle headlamp of the first embodiment is sectioned in a lateral direction.
Figure 2B:
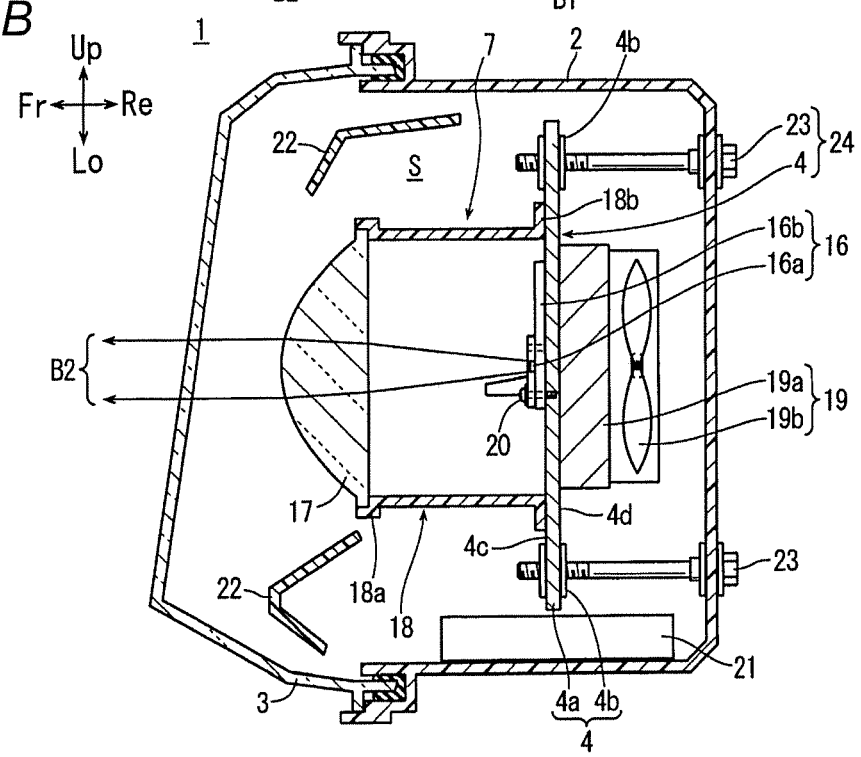
FIG. 2B is a cross sectional view taken along line II-II of FIG. 1 in which a high-beam lamp unit of the vehicle headlamp of the first embodiment is sectioned in a vertical direction.

The support member 4 of FIG. 2A and FIG. 2B is formed of metal, and has a base plate portion 4a for fixing the low-beam headlamp unit 6 and the high-beam headlamp unit 7, and screw securing portions 4b provided on the base plate portion 4a at two positions on lower left and lower right sides and one position on an upper right side.

The low-beam headlamp unit 6 includes a main body 8, a light source 9, a reflecting mirror 10, a projection lens 11, a shade 12, and a heat sink 13 shown in FIG. 2A. The main body 8 is formed of metal, and the light source 9 is configured by one or a plurality of light emitting elements 9a, such as LEDs or laser diodes including a fluorescent substance, which generate white light and a substrate 9b, and is fixed to an upper surface of the main body 8. The reflecting mirror 10 has a spheroidal surface 10a surrounding the light source 9 and is fixed to the upper surface of the main body 8 to reflect light B1 emitted from the light source 9 forward.

Figure 5A:
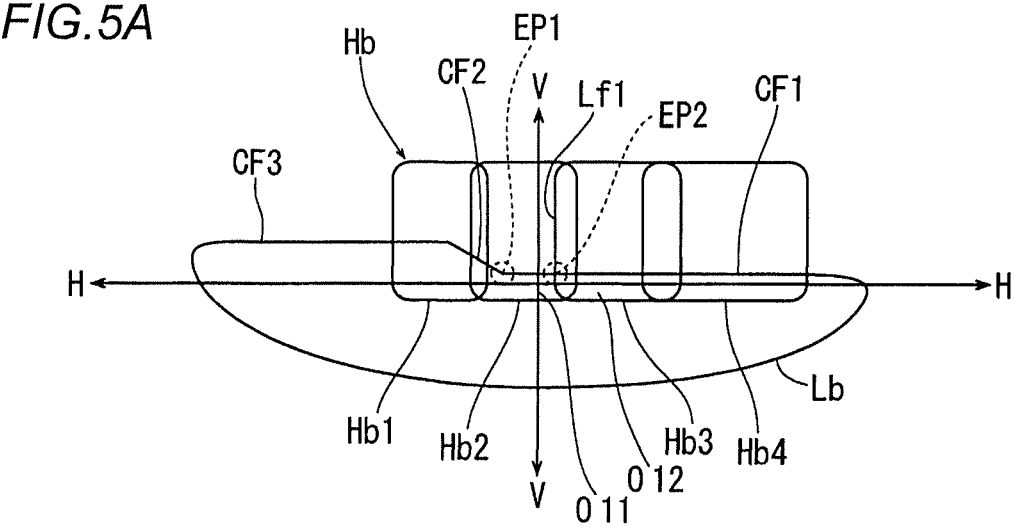
FIG. 5A is diagram showing light distribution patterns illuminated by headlamp units of the first embodiment before aiming adjustment.

The projection lens 11 of FIG. 2A is a transparent or semi-transparent plano-convex lens, is fixed to a front end of the main body 8 so as to be located forward of the reflecting mirror 10, and transmits the light B1 forward. The shade 12 is provided between the reflecting mirror 10 serving as a part of the upper surface of the main body 8 and the projection lens 11, and blocks a part of the light B1 to form horizontal cutoff lines CF1, CF3 and an oblique cutoff line CF2 of a low-beam light distribution pattern Lb as shown in FIG. 5A.

In FIG. 2A, the light B1 passing through the shade 12 sequentially passes through the projection lens 11 and the front cover 3, and illuminates a low-beam light distribution pattern Lb at a front side thereof. The heat sink 13 is configured by a plurality of metal heat radiation fins 13a and a cooling fan 13b. The main body 8 is fixed to a front face 4c of the base plate portion 4a, and the heat radiation fins 13a are fixed to a rear face 4d of the base plate portion 4a on a rear side of the main body 8. Heat from the light source 9 is sequentially transmitted to the substrate 9b, the main body 8, the base plate portion 4a, and the plurality of heat radiation fins 13a, and is radiated to the lamp chamber S by the cooling fan 13b.

The high-beam headlamp unit 7 includes an LED array 16 which is a light source, a projection lens 17, a lens holder 18, and a heat sink 19, as shown in FIG. 2A. The LED array 16 includes a plurality of (eight in the embodiment) light emitting elements (LED including a phosphor) 16a which generates white light and a substrate 16b. The number of light emitting elements 16a is not limited to eight, and the LED array 16 may be configured as a laser light array in which a plurality of laser diodes which generate white light may be used as the light emitting elements. The substrate 16b is fixed to the front face 4c of the base plate portion 4a by a plurality of screws 20 with the light emitting elements 16a facing forward. The projection lens 17 is a transparent or semi-transparent plano-convex lens.

The lens holder 18 has a front end lens securing portion 18a which is a cylindrical member formed of a resin or the like, and a rear end flange portion 18b. In the lens holder 18, the projection lens 17 is fixed to the lens securing portion 18a, and the flange portion 18b is fixed to the front face 4c of the base plate portion 4a while surrounding the LED array 16 inside. The heat sink 19 is formed by a plurality of metal heat radiation fins 19a and a cooling fan 19b, and the heat radiation fins 19a are fixed to the rear face 4d of the base plate portion 4a on a rear side of the LED array 16. Heat generated by the light emitting elements 16a of the LED array 16 is sequentially transmitted to the substrate 16b, the base plate portion 4a, and the plurality of heat radiation fins 19a, and is radiated to the lamp chamber S by the cooling fan 19b.

The light source 9 of the low-beam headlamp unit 6 and the LED array 16 of the high-beam headlamp unit 7 are electrically connected to a control unit 21 provided on the lamp body 2 in the lamp chamber S, and the control unit 21 controls the light emitting element 9a and the light emitting element 16a to be turned on and off individually. The plurality of light emitting elements 9a may be controlled by the control unit 21 so as to be entirely turned on or off.

Light B2 emitted from the plurality of light emitting elements 16a of the LED array 16 shown in FIG. 1 to FIG. 2B passes through the front cover 3 while being collimated by the projection lens 17, and illuminates a high-beam light distribution pattern Hb formed by synthesizing rectangular multi-divided light distribution patterns Hb1 to Hb4 with rounded corners, as shown in FIG. 5A which are illuminated by respective light emitting elements 16a. In FIG. 2A, FIG. 5A to FIG. 6C, for convenience of description, it is assumed that only four of the eight light emitting elements 16a are turned on.

As shown in FIG. 1 to FIG. 2B, an extension reflector 22 for blindfolding from the front is provided around the low-beam headlamp unit 6 and the high-beam headlamp unit 7. The support member 4 to which the low-beam headlamp unit 6 and the high-beam headlamp unit 7 are fixed is supported by the lamp body 2 by screwing three aiming screws 23 which are rotatably held in the lamp body 2 to the screw securing portions 4b of the base plate portion 4a.

The support member 4 configures an aiming adjustment mechanism 24 for the vehicle headlamp 1 of the first embodiment together with the control unit 21 and the three aiming screws 23. Since the low-beam headlamp unit 6 and the high-beam headlamp unit 7 are fixed to the common support member 4, the headlamp units are integrally tilting upward, downward, leftward and rightward by independently rotating each aiming screw 23, so as to perform the aiming adjustment.

Next, a vehicle headlamp 31 of a second embodiment to be used in the aiming adjustment method will be described with reference to FIG. 3 to FIG. 4B. In the vehicle headlamp 1 of the first embodiment, since the low-beam headlamp unit 6 and the high-beam headlamp unit 7 are integrally provided on the common support member 4 to be integrally tilted, the aiming adjustment cannot be performed on each light source unit independently, but in the vehicle headlamp 31 of the second embodiment, the low-beam headlamp unit and the high-beam headlamp unit can be independently tilted so as to allow independent aiming adjustment.

Figure 3:
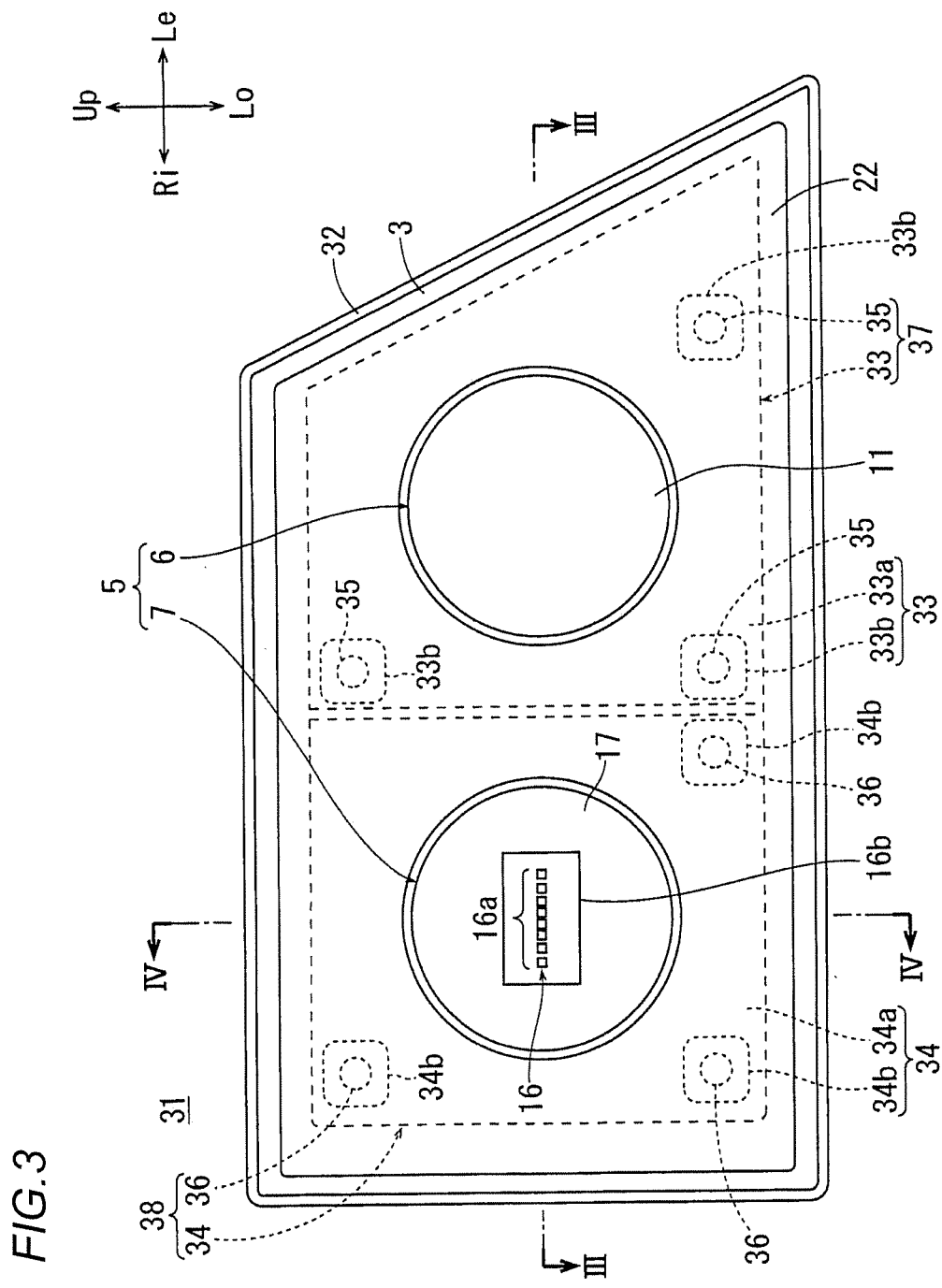
FIG. 3 is a front view of a vehicle headlamp according to a second embodiment to be used for aiming adjustment.
Figure 4A:
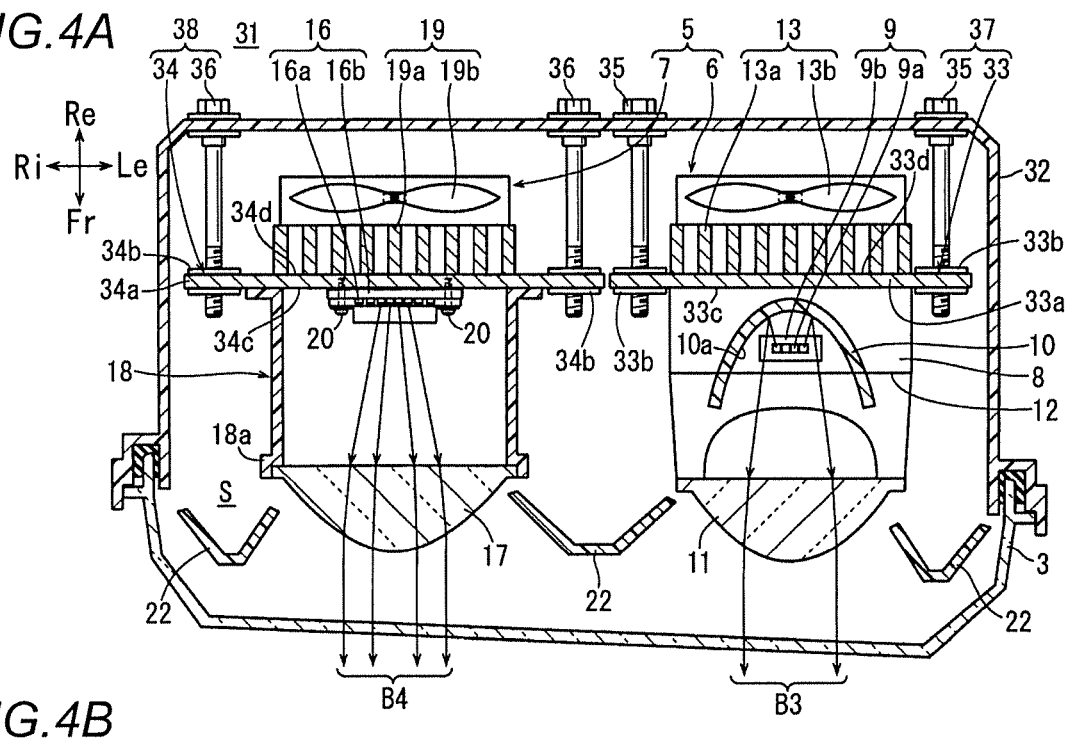
FIG. 4A is a cross sectional view taken along line of FIG. 3 in which the vehicle headlamp of the second embodiment is sectioned in a lateral direction.
Figure 4B:
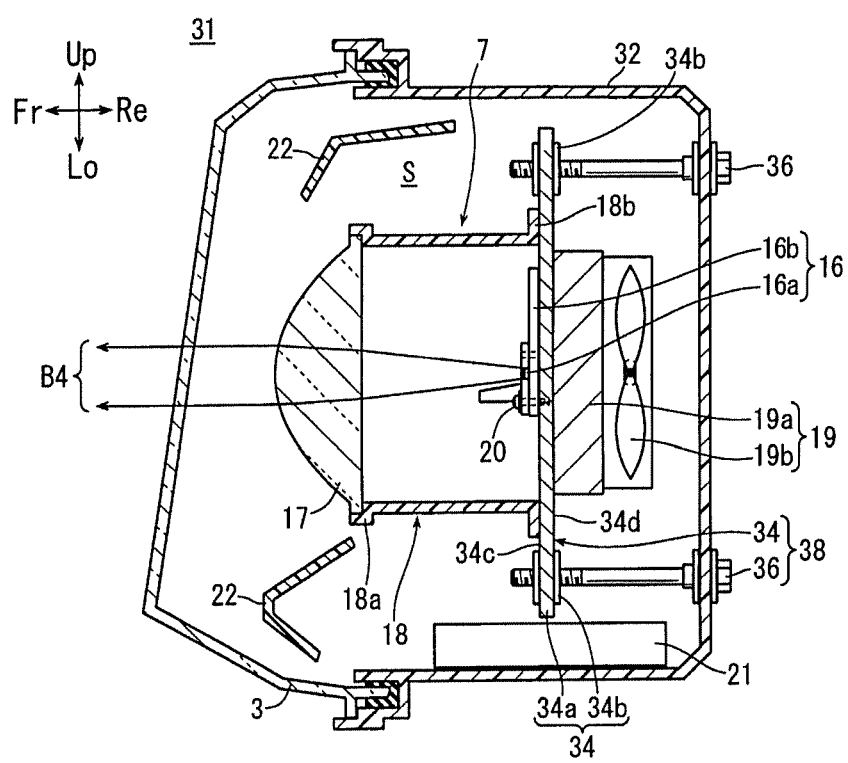
FIG. 4B is a cross sectional view taken along line IV-IV of FIG. 3 in which a high-beam lamp unit of the vehicle headlamp of the second embodiment is sectioned in a vertical direction.

The vehicle headlamp 31 of the second embodiment shown in FIG. 3 to FIG. 4B has a configuration similar to the vehicle headlamp 1 of the first embodiment except that a lamp body 32, metal support members 33, 34 and three aiming screws 35, 36 are provided in place of the lamp body 2, the support member 4 and the three aiming screws 23.

The lamp body 32 shown in FIG. 3 to FIG. 4B is formed by a resin or the like and has an opening on the front side of the vehicle, and the front cover 3 is attached to the opening so as to form the lamp chamber S inside. The three aiming screws 35 and the three aiming screws 36 are rotatably supported in the lamp body 32 inside the lamp chamber S.

The support member 33 shown in FIG. 4A is formed of metal, and has a base plate portion 33a for fixing the low-beam headlamp unit 6, and screw securing portions 33b provided on the base plate portion 33a at two positions on the lower left and right sides, and provided on one position on the upper right side. In the second embodiment, the main body 8 of the low-beam headlamp unit 6, to which the light source 9, the reflecting mirror 10, and the projection lens 11 are fixed, is fixed to a front face 33c of the base plate portion 33a, and the heat radiation fins 13a are fixed to a rear face 33d of the base plate portion 33a on a rear side of the main body 8.

As shown in FIG. 4A, the support member 33 to which the low-beam headlamp unit 6 is fixed is supported by the lamp body 32 by separately screwing the three aiming screws 35 which are rotatably held in the lamp body 32 to the screw securing portions 33b. The support member 33 configures a first aiming adjustment mechanism 37 for the low-beam headlamp unit 6 of the second embodiment together with the control unit 21 and the three aiming screws 35. The low-beam headlamp unit 6 of the second embodiment is tilted upward, downward, leftward and rightward by independently rotating each aiming screw 35, so as to perform the aiming adjustment.

As shown in FIG. 4A, light B3 emitted from the light source 9 of the second embodiment is reflected forward by the reflecting mirror 10, and passes through the projection lens 11 and the front cover 3 while being partially shielded by the shade 12, so as to illuminate the low-beam light distribution pattern Lb including the horizontal cutoff lines CF1, CF3 and the oblique cutoff line CF2 as shown in FIG. 5A on a front side of the vehicle (not shown).

The support member 34 shown in FIG. 4A is formed of metal, and has a base plate portion 34a for fixing the high-beam headlamp unit 7, and screw securing portions 34b provided on the base plate portion 34a at two positions on the lower left and right sides and one position on the upper right side. In the second embodiment, the LED array 16 of the high-beam headlamp unit 7 and the lens holder 18 to which the projection lens 17 is fixed are fixed to a front face 34c of the base plate portion 34a by screws 20 or the like, and the heat radiation fins 19a are fixed to a rear face 34d of the base plate portion 34a on a rear side of the LED array 16.

As shown in FIG. 4A, the support member 34 to which the high-beam headlamp unit 7 is fixed is supported by the lamp body 32 by separately screwing the three aiming screws 36 that are rotatably held in the lamp body 32 to the screw securing portions 34b. The support member 34 configures a second aiming adjustment mechanism 38 for the high-beam headlamp unit 7 of the second embodiment together with the control unit 21 and the three aiming screws 36. The high-beam headlamp unit 7 of the second embodiment is tilted upward, downward, leftward and rightward by independently rotating each aiming screw 36, so as to perform the aiming adjustment.

The plurality of light emitting elements 16a of the LED array 16 of the second embodiment shown in FIG. 4A and FIG. 4B are turned on and off based on control of the control unit 21, and light B4 emitted from the turned-on light emitting elements 16a passes through the front cover 3 after being collimated by the projection lens 17, and illuminates a high-beam light distribution pattern Hb formed by synthesizing the multi-divided light distribution patterns Hb1 to Hb4, having a rectangular shape with rounded corners which is illuminated by each of the light emitting elements 16a, as shown in FIG. 5A. In FIG. 4A to FIG. 6C, for convenience of description, it is assumed that only four of the eight light emitting elements 16a are turned on.

Since the low-beam headlamp unit 6 and the high-beam headlamp unit 7 of the first embodiment shown in FIG. 1 and FIG. 2A are fixed to the common support member 4 and are tilted integrally, the high-beam light distribution pattern Hb shown in FIG. 5A is also tilted integrally with the low-beam light distribution pattern Lb during aiming adjustment. However, the low-beam headlamp unit 6 and the high-beam headlamp unit 7 of the second embodiment are fixed to the support members 33, 34 which can be tilted independently and the aiming adjustment can be performed independently thereon, so that the high-beam light distribution pattern Hb shown in FIG. 5A is also tilted independently of the low-beam light distribution pattern Lb during the aiming adjustment so as to adjust a relative positional relationship therebetween.

As one of the control methods of the LED array 16, the control unit 21 of the vehicle headlamps 1, 31 of the first and second embodiments shown in FIG. 2B and FIG. 4B has a lighting mode for aiming adjustment in which only a predetermined light emitting element 16a which forms a vertical light-dark boundary of the multi-divided light distribution patterns Hb1 to Hb4 is turned on at a center of the light distribution pattern when the LED array 16 is entirely turned on. In the first and second embodiments, in order to set a vertical light-dark boundary Lf1 which is a left side of a multi-divided light distribution pattern Hb3 among the multi-divided light distribution patterns Hb1 to Hb4 as a reference for the left-right aiming adjustment, the control unit 21 illuminates only the multi-divided light distribution pattern Hb3 in the lighting mode for aiming adjustment.

In the lighting mode for aiming adjustment, it may be most energy-efficient to turn on only the predetermined light emitting element 16a corresponding to the multi-divided light distribution pattern Hb3, but the aiming adjustment can be performed as long as the vertical light-dark boundary Lf1 of the multi-divided light distribution pattern Hb3 is formed. Therefore, in the lighting mode for aiming adjustment, as long as the multi-divided light distribution pattern Hb3 is illuminated without illuminating the multi-divided light distribution pattern Hb2 which overlaps the vertical light-dark boundary Lf1, the other multi-divided light distribution patterns may be illuminated.

The vehicle headlamps 1, 31 of the first and second embodiments shown in FIG. 1 to FIG. 4A are formed as an adaptive driving beam headlamp, and detection results relating to oncoming vehicles, pedestrians, or the like on the road which are detected by an on-vehicle camera (not shown) are fed back by the control unit 21. For example, when an oncoming vehicle, a pedestrian, or the like is detected in an irradiation area of Hb4 in a state where all of the multi-divided light distribution patterns Hb1 to Hb4 are turned on, the control unit 21 turns off only a light emitting element 16a illuminating the Hb4 to prevent generation of glare light to a driver of the oncoming vehicle or the pedestrian.

However, the high-beam headlamp unit 7 and the detection camera (not shown) which is swingable upward, downward, leftward and rightward may be attached to a vehicle headlamp or a vehicle deviating from predetermined assembling positions due to a manufacturing error or the like. In this case, since the multi-divided light distribution patterns formed by the light emitting elements 16a of the LED array 16 are irradiated with having deviation from a predetermined direction due to the manufacturing error, even if a predetermined light emitting elements 16a are turned off based on the detection result of the detection camera, the remaining turned-on light emitting elements 16a may irradiate glare light to the oncoming vehicle, the pedestrian, or the like. Therefore, a range of the light emitting elements 16a which should be turned off with respect to the detection position may be set rather widely so as to prevent glare light, due to the manufacturing or assembling error, from irradiating the oncoming vehicle, the pedestrian, or the like.

Such setting would excessively narrow the irradiation range of the high-beam light distribution pattern of the adaptive driving beam headlamp, so that improvement of aiming adjustment accuracy in the high-beam headlamp unit is required in the adaptive driving beam headlamp. Therefore, the vehicle headlamps 1, 31 of the first and second embodiments have an advantage for improving the aiming accuracy of the high-beam headlamp unit as compared with the conventional headlamp unit.

The aiming adjustment method by the vehicle headlamp 1 of the first embodiment will be described with reference to FIG. 5A to FIG. 5C. When the low-beam headlamp unit 6 and the high-beam headlamp unit 7 in FIG. 2A are turned on, and both the low-beam light distribution pattern Lb and the high-beam light distribution pattern Hb which is formed by the multi-divided light distribution patterns Hb1 to Hb4, are irradiated to a front side of the vehicle (not shown), an image as shown in FIG. 5A is obtained. The reference numeral O11 denotes a predetermined position to which an elbow point (reference point) of the irradiated low-beam light distribution pattern is to appear, and the reference numeral O12 denotes a predetermined position to which an elbow point of the irradiated high-beam light distribution pattern Hb is to appear. The aiming adjustment is performed by tilting the low-beam headlamp unit 6 and the high-beam headlamp unit 7 such that the elbow point set in advance on the light-dark boundary of the pattern coincides with a predetermined position.

The light-dark boundary of the light distribution pattern is determined such that a light distribution pattern is illuminated on a screen provided on a front side of a vehicle (not shown) to perform visual measurement by a measuring staff, to measure luminance gradients inside and outside an irradiation range of the light distribution patterns, and to analyze a photograph or an image illuminated on the screen or the like.

Figure 5B:
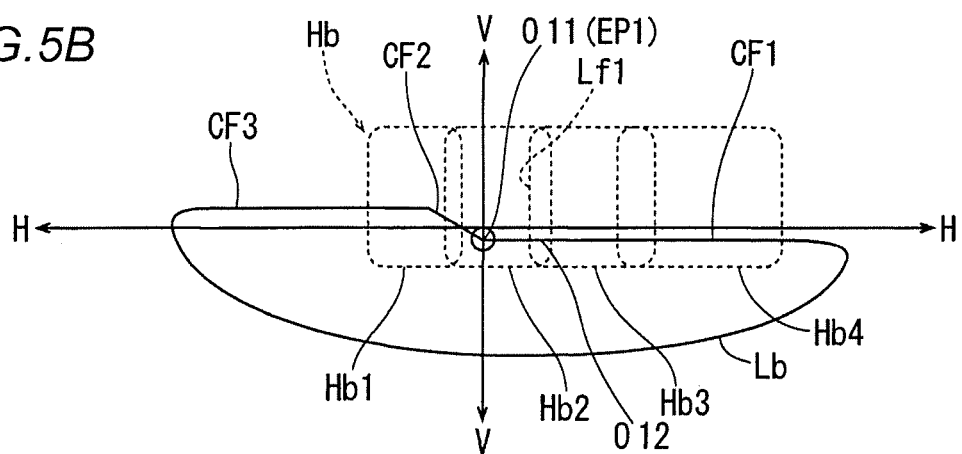
FIG. 5B is a diagram illustrating a conventional aiming adjustment method in a vehicle headlamp.

In a conventional aiming adjustment method, a center of the low-beam light distribution pattern Lb shown in FIG. 5A, that is, an intersection EP1 between the horizontal light-dark boundary CF1 formed by a cutoff line on a lower side and the oblique light-dark boundary CF2 formed by an oblique cutoff line is set as an elbow point, only the low-beam light distribution pattern Lb is turned on as shown in FIG. 5B and the headlamp unit is tilted such that the elbow point EP1 coincides with the predetermined position O11. However, in a case where a relative assembling position of the high-beam headlamp unit 7 with respect to the low-beam headlamp unit 6 deviates from the predetermined position due to a manufacturing error, an assembling error or the like, the vertical light-dark boundary Lf1 of the multi-divided light distribution pattern Hb3 to be used as a reference for left-right aiming adjustment of the high-beam light distribution pattern Hb does not pass through the predetermined position O12 as shown in FIG. 5B.

In this case, even if the low-beam light distribution pattern Lb can be irradiated in a predetermined direction, the light distribution patterns Hb1 to Hb4, which are used in the adaptive driving beam headlamp, cannot be irradiated in the predetermined direction, and the multi-divided light distribution patterns Hb1 to Hb4 may need to be excessively turned off in order to prevent glare to the oncoming vehicle, the pedestrian, or the like which are detected.

Therefore, in the aiming adjustment method using the vehicle headlamp 1 of the first embodiment shown in FIG. 2A and FIG. 2B, the aiming adjustment is performed using an intersection EP2 between the horizontal light-dark boundary CF1 on the lower side of the low-beam light distribution pattern Lb and the vertical light-dark boundary Lf1 of the multi-divided light distribution pattern Hb3 which illuminates a part of the high-beam light distribution pattern Hb shown in FIG. 5A as an elbow point.

Figure 5C:
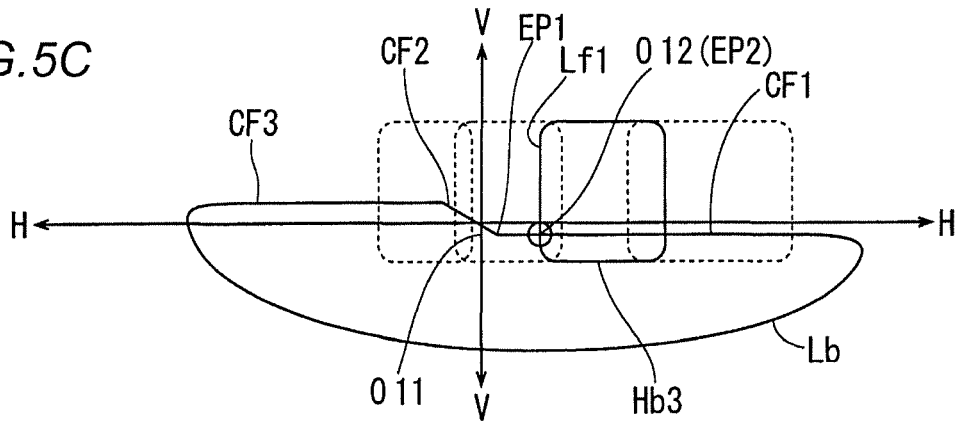
FIG. 5C is a diagram illustrating an aiming adjustment method by the vehicle headlamp of the first embodiment.

Therefore, in the aiming adjustment method, the low-beam headlamp unit 6 is turned on first, the high-beam headlamp unit 7 is further turned on in the lighting mode for aiming adjustment, so that only the low-beam light distribution pattern Lb and the multi-divided light distribution pattern Hb3 are turned on as shown in FIG. 5C, and the elbow point EP2 which is an intersection between the horizontal light-dark boundary CF1 and the vertical light-dark boundary Lf1 is formed at a position shown in FIG. 5A. The low-beam headlamp unit 6 and the high-beam headlamp unit 7 are integrally tilted by the aiming adjustment mechanism 24 such that the elbow point EP2 coincides with the predetermined position O12 as shown in FIG. 5C.

Even if the low-beam light distribution pattern Lb deviates from the predetermined position by the error, the deviation is within an assumed predetermined reference value, and the light distribution pattern is a downward light distribution, so that the problem of glare light to a pedestrian, an oncoming vehicle or the like is less likely to occur as compared to the high-beam distribution pattern Hb. Therefore, it can be said that the aiming method is advantageous in the adaptive driving beam headlamp including the aiming adjustment mechanism 24 as in the first embodiment in which the low-beam headlamp unit 6 and the high-beam headlamp unit 7 can only be tilt integrally.

Figure 6A:
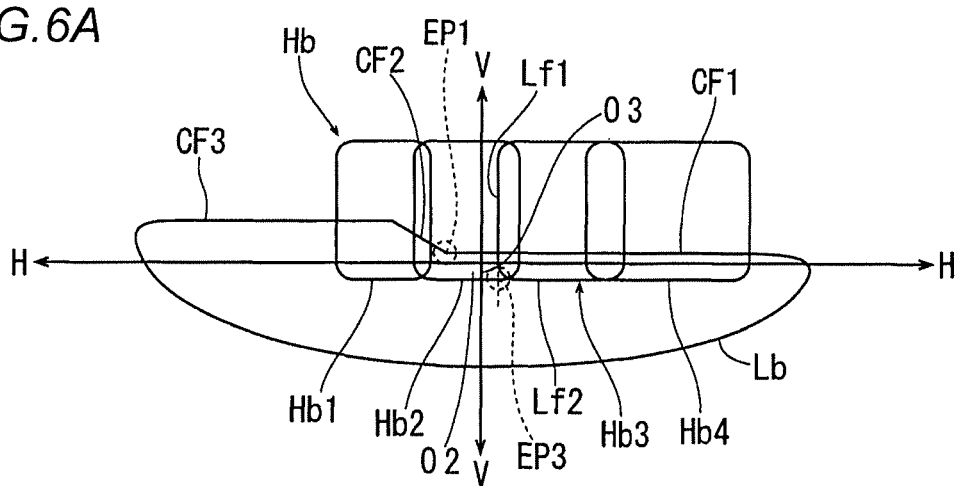
FIG. 6A is a diagram illustrating light distribution patterns illuminated by headlamp units of the second embodiment before aiming adjustment.

Further, in the aiming adjustment method using the vehicle headlamp 31 of the second embodiment shown in FIG. 4A and FIG. 4B, the elbow point EP1 of the low-beam light distribution pattern Lb shown in FIG. 6A and an elbow point EP3 of the multi-divided light distribution pattern Hb3 which forms a part of the high-beam light distribution pattern Hb are set separately, and the aiming adjustment of the low-beam headlamp unit 6 and the high-beam headlamp unit 7 is performed independently.

Figure 6B:
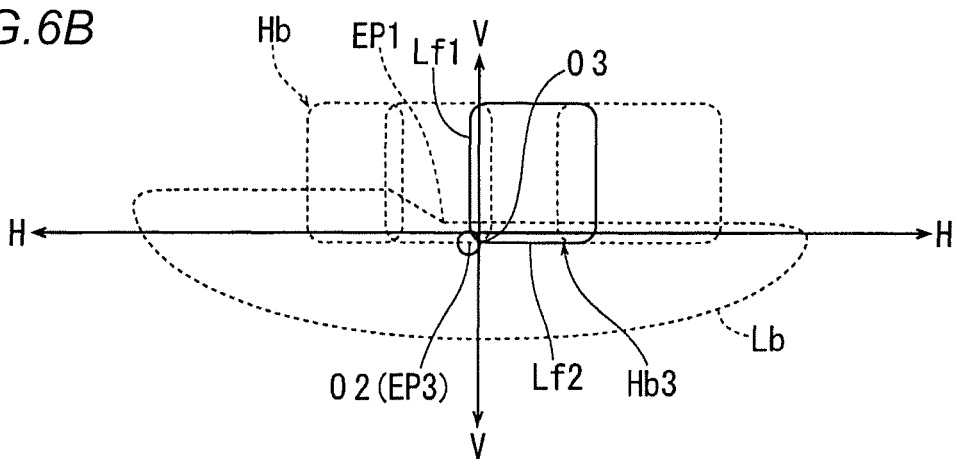
FIG. 6B is a diagram illustrating an aiming adjustment method of a high-beam light distribution pattern by the vehicle headlamp of the second embodiment.

Image analysis is performed on the vertical light-dark boundary Lf1 and the horizontal light-dark boundary Lf2 of the multi-divided light distribution pattern Hb3 shown in FIG. 6A and FIG. 6B by an on-vehicle camera (not shown) and the control unit 21. Then, the elbow point EP3 of the multi-divided light distribution pattern Hb3 shown in FIG. 6A to FIG. 6C is set as an intersection of their virtual extension lines.

The reference numeral O2 in FIG. 6A and FIG. 6B denotes a predetermined position to which the elbow point EP3 of the irradiated multi-divided light distribution pattern Hb3 is to appear, and the reference numeral O3 denotes a predetermined position to which the elbow point EP1 of the irradiated low-beam light distribution pattern beam Lb is to appear.

As shown in FIG. 6B, the aiming adjustment of the high-beam light distribution pattern Hb is performed such that the multi-divided light distribution pattern Hb3 which forms a part of the high-beam light distribution pattern Hb is illuminated in a state where the low-beam light distribution pattern Lb is turned off, and the high-beam headlamp unit 7 is tilted by operating the second aiming adjustment mechanism 38 such that the elbow point EP3 of the multi-divided light distribution pattern Hb3 set by the image analysis coincides with the predetermined position O2.

Figure 6C:
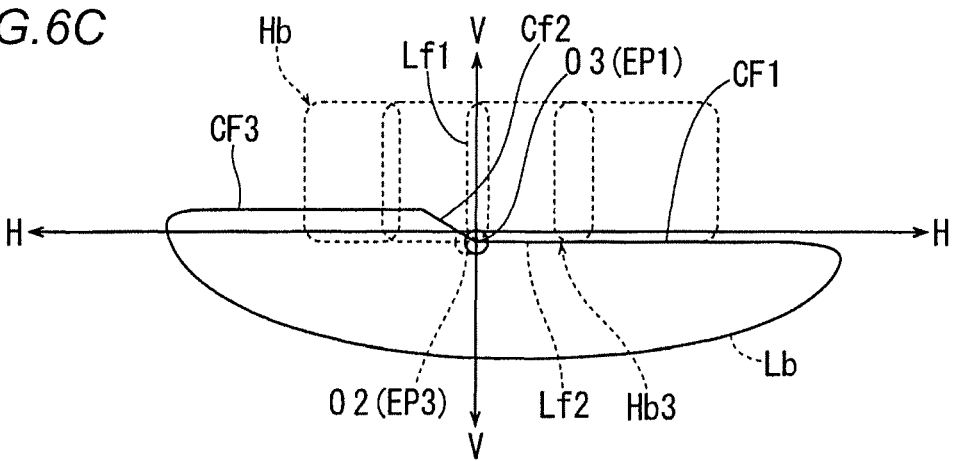
FIG. 6C is a diagram illustrating an aiming adjustment method of a low-beam light distribution pattern by the vehicle headlamp of the second embodiment.

As shown in FIG. 6C, the aiming adjustment of the low-beam light distribution pattern Lb is performed such that the low-beam headlamp unit 6 is tilted by operating the first aiming adjustment mechanism 37 so as to make the elbow point EP1 of the low-beam light distribution pattern Lb coincide with the predetermined position O3, where the elbow point EP1 is illuminated by turning on the low-beam light distribution pattern Lb in a state where the high-beam light distribution pattern Hb, including the multi-divided light distribution pattern Hb3, is entirely not illuminated.

According to the aiming method, the multi-divided light distribution patterns Hb1 to Hb4 which are used in the adaptive driving beam headlamp can be irradiated in a predetermined direction, and therefore, excessive light-off of the multi-divided light distribution patterns Hb1 to Hb4 for preventing glare to an oncoming vehicle or the like can be avoided, so that a high-beam light distribution pattern Hb with a wide irradiation range can be formed, and the low-beam light distribution pattern Lb can also be irradiated with high accuracy in the predetermined direction. Therefore, the aiming method may be advantageous for the adaptive driving beam headlamp including the first and second aiming adjustment mechanisms 37, 38 as in the second embodiment through which the low-beam headlamp unit 6 and the high-beam headlamp unit 7 can be tilted independently.

The invention claimed is:

1. An aiming adjustment method for a vehicle headlamp which performs aiming adjustment based on a reference point on a light-dark boundary of a light distribution pattern, the method comprising:
    setting, as the reference point, an intersection between a vertical light-dark boundary of a part of multi-divided light distribution patterns which are to be synthesized to form a high-beam light distribution pattern and a horizontal light-dark boundary of a low-beam light distribution pattern; and
    tilting one or more headlamp units of the vehicle headlamp by rotating a plurality of screws that fix the one or more headlamp units to a support member of the vehicle headlamp, such that the reference point coincides with a predetermined position to which an elbow point of the high-beam light distribution pattern is to appear.

2. An aiming adjustment mechanism for a vehicle headlamp that comprises a high-beam headlamp unit which is configured to illuminate a high-beam light distribution pattern by synthesizing multi-divided light distribution patterns, and a low-beam headlamp unit which is configured to illuminate a low-beam light distribution pattern, the aiming adjustment mechanism comprising:
    a plurality of screws that rotatably fix at least one of the high-beam headlamp unit and the low-beam headlamp unit to a support member of the vehicle headlamp; and
    a control unit that is electrically connected to the high-beam headlamp unit and the low-beam headlamp unit,
    wherein, when the control unit is in a lighting mode for aiming adjustment, the control unit:
        causes the high-beam headlamp unit to illuminate a part of the multi-divided light distribution patterns and causes the low-beam headlamp unit to illuminate the low-beam light distribution pattern, so as to form an intersection between a vertical light-dark boundary of the multi-divided light distribution pattern and a horizontal light-dark boundary of the low-beam light distribution pattern, and tilts the high-beam headlamp unit and the low-beam headlamp unit by rotating the screws, such that the intersection coincides with a predetermined position to which an elbow point of the high-beam light distribution pattern is to appear.

3. A vehicle headlamp comprising:

an aiming adjustment mechanism;

a support member;

a high-beam headlamp unit which is configured to illuminate a high-beam light distribution pattern by synthesizing multi-divided light distribution patterns; and a low-beam headlamp unit which is configured to illuminate a low-beam light distribution pattern, wherein the aiming adjustment mechanism comprises:

a plurality of screws that rotatably fix at least one of the high-beam headlamp unit and the low-beam headlamp unit to the support member; and a control unit that is electrically connected to the high-beam headlamp unit and the low-beam headlamp unit, and wherein, when the control unit is in a lighting mode for aiming adjustment, the control unit:

causes the high-beam headlamp unit to illuminate a part of the multi-divided light distribution patterns and causes the low-beam headlamp unit to illuminate the low-beam light distribution pattern, so as to form an intersection between a vertical light-dark boundary of the multi-divided light distribution pattern and a horizontal light-dark boundary of the low-beam light distribution pattern, and tilts the high-beam headlamp unit and the low-beam headlamp unit by rotating the screws, such that the intersection coincides with a predetermined position to which an elbow point of the high-beam light distribution pattern is to appear.

* * * * *